United States Patent
Anderson et al.

[15] 3,666,912
[45] May 30, 1972

[54] METHOD OF SOLID STATE BONDING

[72] Inventors: David G. Anderson; John C. Parker, both of Bloomfield Hills, Mich.

[73] Assignee: Quanta Welding Company, Troy, Mich.

[22] Filed: Jan. 8, 1971

[21] Appl. No.: 104,903

[52] U.S. Cl. ..............................219/117, 219/86, 219/91, 219/119
[51] Int. Cl. ..............................B23k 9/00
[58] Field of Search ..............219/117, 91, 78, 86, 119, 85

[56] References Cited

UNITED STATES PATENTS

| | | | |
|---|---|---|---|
| 1,281,454 | 10/1918 | White | 219/119 X |
| 2,305,042 | 12/1942 | Thacker | 219/91 |
| 3,462,577 | 8/1969 | Helms et al. | 219/86 X |
| 3,443,055 | 5/1969 | Gwynn et al. | 219/117 R |

Primary Examiner—J. V. Truhe
Assistant Examiner—L. A. Schutzman
Attorney—Wilson & Fraser

[57] ABSTRACT

An article of manufacture comprised of at least two parts of electrically conductive metal joined together in overlapped relation by a solid state resistance bond at the faying interface wherein the bond area is very precisely defined by the physical shape of the attendant electrodes. The method of bonding the parts includes the utilization of a time phase application of a force pulse and an electrical energy pulse to the assembly of the part to achieve the desired solid state pulse resistance bond.

9 Claims, 7 Drawing Figures

Patented May 30, 1972 3,666,912
2 Sheets-Sheet 1
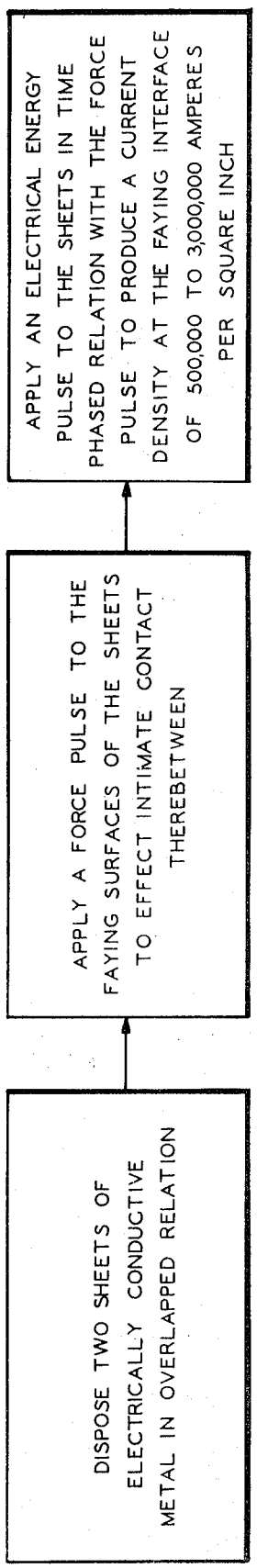
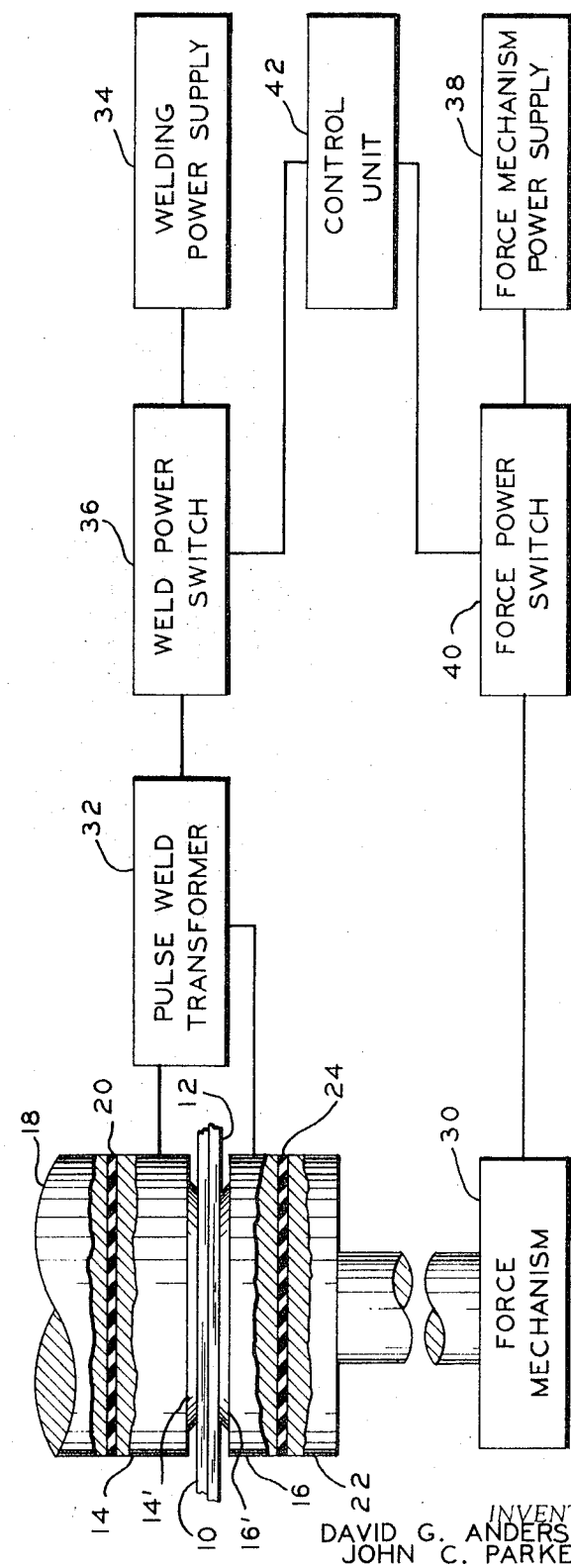
INVENTORS
DAVID G. ANDERSON
JOHN C. PARKER
BY
Wilson & Fraser
ATTORNEYS

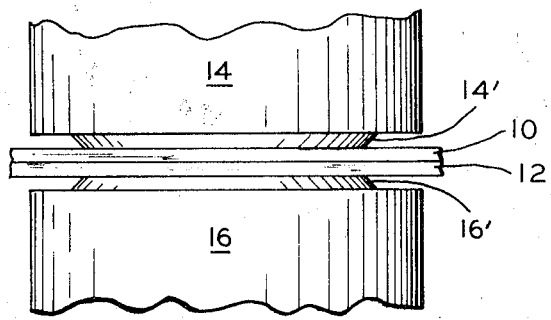
FIG. 3
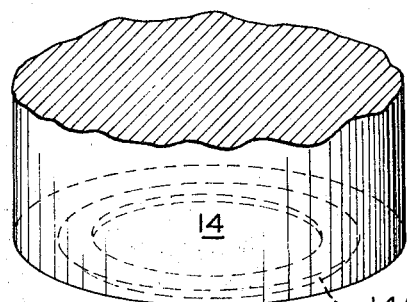
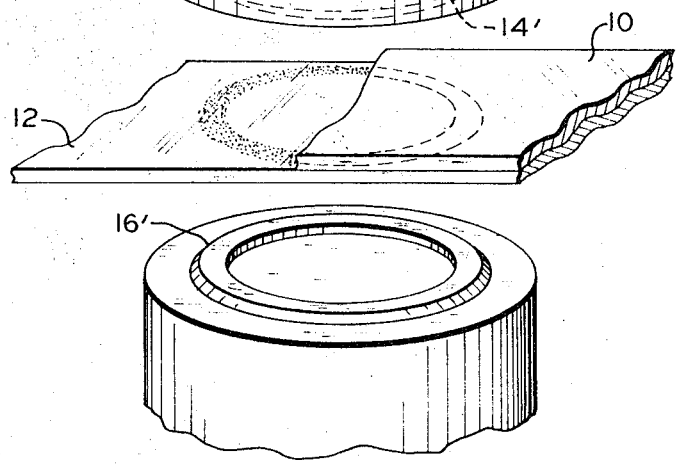
FIG. 4
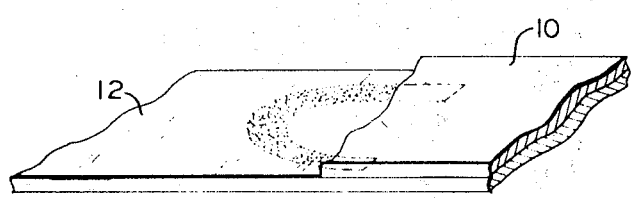
FIG. 5
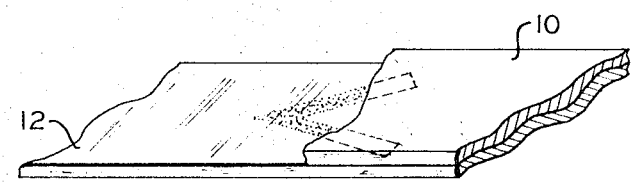
FIG. 6
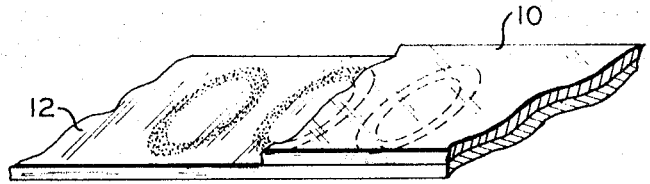
FIG. 7
INVENTORS
DAVID G. ANDERSON
JOHN C. PARKER
BY
Wilson & Fraser
ATTORNEYS

METHOD OF SOLID STATE BONDING

BACKGROUND OF THE INVENTION

Although resistance welds can be obtained in certain electrically conductive metals without reaching the fusion point of the metal, experience to date has manifested that welds of highest strength in stop welded structures are obtained when the metal at the interfaces has fused. Welding conditions necessary for suitable welds in low carbon steels, for example, are not extremely critical and welds of acceptable strength may be obtained over a rather wide range of current, pressure and current timing combinations. For equivalent heating of the metals to effect the desired weld, the duration of the current bears an inverse relationship to the magnitude of the current. For example, shorter current timing periods require higher welding currents and vice versa. The tendency in resistance welding practice has been toward higher currents and shorter current duration periods.

Typically, in such welding techniques, the diameter of the electrode tip has controlled the size of the spot weld. In practice, it has been found that if the diameter of the electrode, and thus the resultant weld area, is too small the resultant spot is too low in total strength and further produces severe surface indentations. Also, it has been found that slight variations in the diameter of the tip of the electrode may result in rather substantial variations in the strength of the weld.

If the diameter of the tip of the electrode is too large, on the other hand, abnormally high currents are required which will produce localized heating resulting in poor surface appearance. More importantly, from a structural standpoint, the resultant weld area may be weak because of voids and blowholes resulting from insufficient unit pressure. The most important criterion of spot weld strength and adequate welding conditions for a given thickness of metal is the diameter of the weld nugget. It is to be understood that the center portion of the weld nugget contributes to a minimal degree to the overall strength of the weld.

Experience has shown in the conventional resistance welding techniques that there is an optimum weld diameter for a given sheet thickness if good weld strength, maximum life, minimum sheet separation and indentation and reasonable weld strength consistency are to be obtained. Typically, weld diameters have been determined for various sheet thicknesses largely empirically. However, the relationship of weld diameter to sheet thickness (for thicknesses from 0.01 to 0.250 inches) may be expressed by the following formula:

Weld Diameter (Inches) = (2.29T + 0.089)

where "T" is the thickness in inches of one thickness (the thinner) of the material being welded.

In the above described techniques, the diameter of the electrode face (contacting surface) should always be somewhat larger than the expected weld diameter to successfully contain the molten weld metal and the minimize expulsion and indentation and, also, to minimize electrode deformation.

It will be manifest that, in view of the above comments, there is a definite limitation to the size of a weld which can be achieved with the known welding techniques.

SUMMARY

The present invention is concerned with the production of an article of manufacture consisting of at least two juxtaposed electrically conductive parts having a definitively shaped solid state pulse resistance bond interconnecting the parts which wherein the zone of bonding includes a thin layer of thermally modified material.

The objectives of the invention are typically achieved by utilizing a pair of electrodes provided with raised regions on the working contacting faces thereof which are maintained in registry on the opposite sides of the juxtaposed parts, and then subjected to a time-phased application of pressure and high current density pulses to produce a weld interconnecting the parts having negligible indentation on the exposed surface of the parts and having a shaped weld zone of minimal depth. The shaped weld is determined by the shape of the raised portions of the contacting faces of the electrodes.

BRIEF DESCRIPTION OF THE DRAWINGS

The above and other objects of the invention will become manifest to those skilled in the art from reading the following detailed description of an embodiment of the invention when considered in the light of the accompanying drawings in which:

FIG. 1 is a flow diagram of the method of the invention;

FIG. 2 is a schematic diagram of one form of the apparatus and associated system for accomplishing the method illustrated in FIG. 1;

FIG. 3 is an enlarged fragmentary view of the electrodes and work places being bonded together as illustrated in FIG. 3;

FIG. 4 is an exploded view of the electrodes illustrated in FIG. 3; and

FIG. 5, 6 and 7 illustrate typical weld shapes which can be effectively achieved by the method of the invention to produce new and useful articles of manufacture.

DESCRIPTION OF PREFERRED EMBODIMENT

As diagrammatically illustrated in FIG. 1, there is shown in flow diagram form the process of the invention as applied to the production of an article of manufacture typically comprised of two sheets of electrically conductive material bonded together by a shaped weld. The process basically involves the time-phased application of a force pulse and a pulse of electrical energy to the parts being bonded to effect a current density at the faying interface within the range of from 500,000 to 3,000,000 amperes per square inch at the faying interface of parts being bonded.

To completely understand the process of the invention, as illustrated in FIG. 1, reference will be made to the bonding of two sheets of electrically conductive materials as specifically illustrated in FIGS. 2, 3 and 4. At the outset or commencement of the procedure, two parts 10 and 12 of sheet material such as, for example, 1010 mild steel of a thickness of 0.032 inch are disposed in overlapping superposed relation between a pair of cooperating relatively movable electrodes 14 and 16. The uppermost electrode 14 is mounted on an upper platen or fixed support 18 and is electrically insulated therefrom by a layer of insulating material 20. The lowermost electrode 16 is mounted for unitary movement on a lower platen 22 and is electrically insulated therefrom by a layer of insulating material 24. The lower platen 22 is coupled to a force mechanism 30 which may provide for selective reciprocating movement of the electrode 16 relative to the electrode 14 to initially enable the disposition of the parts 10 and 12 therebetween. At such stage in the operation, the electrodes 14 and 16 are moved together until the assemblage of the parts 10 and 12 are in relatively fixed position. The electrodes 14 and 16 are provided with outwardly extending projections 14' and 16', respectively, which are positioned in registry such that they are in direct alignment when the associated electrodes are in work contacting relation. For use on titanium alloys, for example, the extent of the projections 14' and 16' may be of the order of 0.001 to 0.002 inches which effectively minimizes expulsion and enhances appearance of the finished weld.

The force mechanism 30, which typically includes a pressure transducer, is effective to apply a force pulse on the lower platen 22, which is superimposed on the initial forces applied by the closing of the electrodes 14 and 16 by the relative closing movement of the associated platens 18 and 22. The specific mechanism employed for developing the force by the force mechanism 30 may be the type illustrated and described in the U.S. Patent to A.G. Vang - U.S. Pat. No. 3,059,094 - issued Oct. 16, 1962. It will be understood that in time phased relation with the application of a force pulse on the sheets 10 and 12 by the force mechanism 30, an electrical energy pulse is applied to the electrodes 14 and 16, as will be explained in greater detail hereinafter.

It has been found that in practice, pressures developed of the order of from 1,000 to 10,000 pounds have been employed to produce satisfactory solid state welds with the described process. These pressures are not considered to be critical and may be varied over a rather wide range. The pressures imposed on the system can be imposed in sinusoidal wave form, and, typically, the force pulse is initiated first and before the force pulse reaches the maximum amplitude, the electrical energy pulse is commenced. Typically, the electrical energy pulse is then allowed to fully decay before the full decay of the force pulse. The electrical energy pulse is developed in the system illustrated in FIG. 2 in the secondary winding of a pulse weld transformer 32 which has its power switch 36. The weld power supply 34 typically includes a bank of capacitors and a charging circuit which are effective to produce an instantaneous source of electrical energy to the pulse weld transformer 32 as will be explained in greater detail hereinafter.

The force mechanism 30 is coupled to a force mechanism power supply 38 through a force power switch 40.

The weld power switch 36 and the force power switch 40 are controlled in timed relation to one another by a process control unit 42. The control unit 42 is effective to energized the respective power switches 36 and 40 in such a fashion that, typically, the force power switch 40 is energized to commence the application of force by the lower platen 22 to apply a force pulse at the faying interface of the sheets 10 and 12. Then, the control unit 42 is effective to energize the weld power switch 36 to allow the capacitors of the weld power supply 34 to discharge and produce an electrical energy pulse in the primary winding of the pulse weld transformer 32. The secondary winding of the pulse weld transformer 32 causes a high electrical energy pulse between the electrodes 14 and 16 and the sheets 10 and 12. An electrical energy pulse having a current density of the order of from 500,000 to 3,000,000 amperes per square inch of weld interface has been satisfactory for achieving the desired results of the invention of obtaining a solid state bond. In operation of the illustrated embodiment, the force pulse peaks in the order of from 0.5 to 2.0 milliseconds before electrical energy peaks.

It has been theorized that the phenomenon involved in the welding process of the invention involves electrical energy at the interface of the sheets 10 and 12 in magnitude sufficient to establish atomic bonds across the interface, resulting in a solid state pulse resistance weld. The electrical energy pulse applied by the pulse transformer 32 follows an electrical path through the electrode 14, the sheets 10 and 12 and the electrode 16.

The control unit 42 is typically energized after the lower platen 22 and the upper platen 18 are initially closed to a point where the sheets 10 and 12 are firmly held between terminal ends of the electrodes 14 and 16. The energized control unit 42 initially signals the force switch 40 to couple the force mechanism 30 to its power supply 38 to effectively impart a force pulse of 8.0 millisecond duration, for example, with a peak force of approximately 5,000 pounds to the platen 22, causing the sheets 10 and 12 to be bonded to be forced tightly against the adjacent overlapped surfaces.

Typically, the control unit 42 is programmed to energize the weld power switch 36 coupling the pulse transformer 32 to the welding power supply 38 to thereby apply an electrical energy pulse to the electrode elements 14 and 16. The energization thereof commences, in the described embodiment, prior to the instant the force pulse reaches its peak amplitude.

The temperature of the overall mass of the bonded members is raised only slightly during the bonding process, for example, 5° to 10° F., while at the interface where high electrical resistance exists, there is a small localized area of substantial thinness or surface skin which may approach melting or forging temperatures. The energy requirements are typically only 10 to 20 per cent of the magnitude of the energy requirements of conventional welding processes.

Since the solid state pulse resistance bonding procedure described above is capable of joining metal parts without significant melting and resultant change in the crystalline structure of the metal, and capable of more exactly controlling and determining the electrical current path, very precisely shaped weld configurations can be achieved. FIG. 4, for example, shows an annularly shaped weld. Such a weld consumes less energy to effect than a spot weld, for example, wherein the entire circular area is welded. A weld configuration such as illustrated in FIG. 4 exactly conforms to the configuration of the cooperating electrode projections 14' and 16' and is equally as strong as a weld where the entire curcular area is fused and welded. It has been found empirically that the center portion of a complete circular area weld is of little consequence when considering the overall weld strength and can, in many instances, be completely removed by drilling for example and not change the overall weld strength characteristics.

Having the capability of controlling the current path between the projections 14' and 16' of the electrodes 14 and 16, respectively, many differently shaped projections can be formed to provide for various corresponding shaped welds. Typical shapes of the electrode projections can achieve weld shapes of the types illustrated in FIGS. 5, 6 and 7.

In one typical embodiment, it has been found in welding two sheets of a titanium alloy together wherein the alloy contained of the order of 6 percent aluminum and 4 percent vanadium of a thickness of 0.040 inch, a weld having an O.D. of 0.500 inch and an I.D. of 0.400 inch was formed having a tensile shear strength of more than 5,000 pounds. A conventional resistance or spot weld of maximum size for the same material would exhibit a tensile shear strength of approximately 2,500 pounds. Accordingly, it is readily apparent that the present invention can produce a weld of larger diameter than conventionally achieved welds which inherently results in greatly enhanced mechanical properties such as tensile strength and fatigue strength, for example.

It has been found that the weld shapes produced by the shaped electrodes projections conform rather exactly to the shape of the cooperating electrode projections. As pointed out herein above, in the conventional resistance welding techniques the diameter or shape of the electrode is empirically determined and is usually larger in diameter than the diameter of the resultant weld.

While mention has specifically been made to the effect that the electrode elements employed for carrying out the method of the invention in producing the desired composite have been found to have projections or extensions therefrom of the desired shape, satisfactory results can be achieved by shaping the entire electrode with the cross-sectional configuration of the desired bond to be formed.

In accordance with the provisions of the patent statutes, we have explained the principle and mode of operation of our invention and have illustrated and described what we now consider to represent its best embodiment. However, we desire to have it understood that the invention may be practiced otherwise than as specifically illustrated and described without departing from its spirit or scope.

What we claim is:

1. A method of producing a sharply defined bond between at least two parts of electrically conductive material comprising:

providing a first surface of one of said parts;
providing a second surface of the other of said parts;
engaging said first and second surfaces;
providing a pair of opposing registering shaped electrodes on opposite sides of said first and second surfaces;
imposing a force pulse on the faying interface between said first and second surfaces to urge said surfaces into intimate contact; and
applying an electrical energy pulse between said electrodes to produce a current density within the range of from 500,000 to 3,000,000 amperes per square inch of faying interface between said first and second surfaces desired to be welded in time-phased relation with said force pulse to produce a sharply disposed solid state resistance bond to weld said surfaces together to form an integral bonded article.

2. The method defined in claim 1 wherein at least one of said shaped electrodes is provided with a shaped projection extending from the distal portion thereof.

3. The method defined in claim 1 wherein said shaped electrodes are provided with shaped extensions extending from the distal portions thereof in registry with one another.

4. The method as defined in claim 1 wherein said electrical energy is applied as a single pulse.

5. The method as defined in claim 4 wherein said electrical energy pulse is of a duration of from 0.5 to 5.5 milliseconds.

6. The method defined in claim 1 wherein the force pulse applied to said parts arrives at its peak amplitude before the electrical energy pulse arrives at its peak magnitude.

7. The method as defined in claim 1 wherein at least one of said parts is a metal sheet.

8. The method as defined in claim 3 wherein said shaped projections on said cooperating electrodes are annular.

9. The method as defined in claim 1 wherein said force pulse peaks after said electrical energy pulse peaks.

* * * * *